United States Patent [19]

Lahalih et al.

[11] Patent Number: 4,839,095
[45] Date of Patent: Jun. 13, 1989

[54] STABLE MUD DRILLING FLUID ADDITIVE, COMPOSITION AND PROCESS FOR MAKING THE SAME

[76] Inventors: Shawqui Lahalih; Issam Dairanieh; Ma'mun Absi-Halabi, all of P.O. Box 24885, Safat, Kuwait

[21] Appl. No.: 95,688

[22] Filed: Sep. 14, 1987

[51] Int. Cl.$^4$ ................................................ C09K 7/02
[52] U.S. Cl. ................................ 252/8.514; 252/8.51; 524/843
[58] Field of Search ............................ 252/8.514, 8.51

[56] References Cited

U.S. PATENT DOCUMENTS

| | | |
|---|---|---|
| 2,679,478 | 5/1954 | Fischer et al. .................... 252/8.514 |
| 2,730,497 | 1/1956 | Suen et al. ........................ 252/8.514 |
| 3,872,018 | 3/1975 | Alexander ...................... 252/8.51 X |
| 3,956,140 | 5/1976 | Nahm et al. ...................... 252/8.51 |
| 4,045,357 | 8/1977 | Reed .................................. 252/8.51 |
| 4,322,300 | 3/1982 | Holmquist ........................ 252/8.51 |
| 4,473,480 | 9/1984 | Green et al. .................... 252/8.514 |
| 4,631,137 | 12/1986 | Dymond .......................... 252/8.514 |
| 4,677,159 | 6/1987 | Lahalih et al. ...................... 528/254 |

*Primary Examiner*—Herbert B. Guynn

[57] ABSTRACT

A drilling fluid includes a water soluble polymer such as a sulfonated amino-formaldehyde and/or methyl cellulose or polyvinyl alcohol in addition to water, bentonite and a weighting agent such as barite. And, these drilling fluids have improved heat stability and are useful for drilling a borehole into a subterranean formation using conventional drilling equipment.

13 Claims, No Drawings

STABLE MUD DRILLING FLUID ADDITIVE, COMPOSITION AND PROCESS FOR MAKING THE SAME

BACKGROUND OF THE INVENTION

The present invention relates to a water based well servicing fluid, additives therefore, and to a process for preparing the same. More particularly, the present invention relates to the formation and use of an improved drilling fluid which includes a sulfonated amino-aldehyde, methyl cellulose and/or polyvinyl alcohol.

In well drilling, a drilling fluid or mud is pumped down through the drill stem of the rotary rig, circulated around the drill bit and returned to the surface through the annular passage between the drill stem and the well wall. The drilling fluid lubricates the drill stem and bit, cools the bit and carries the cuttings from the bit up to the surface. The drilling fluid also provides a hydrostatic head against the walls of the well to contain downhole geopressure.

In drilling for oil, gas or water there are generally three zones. The first zone ranges from 0-5000 feet, while the second and third zones range from 5000 to 7000 feet and greater than 7000 feet respectively.

During the initial stage of drilling, i.e. the first zone of the well, a relatively large bore hole is usually desired. In other words, a relatively large quantity of drill cuttings must be moved to the surface. This requires a well servicing fluid with excellent carrying capacity as indicated by a high yield point which ranges from 20-30 pounds per 100 square feet and a plastic viscosity of 3-6 centipoise.

As the drilling operation gets deeper, smaller bore holes are drilled resulting in smaller amounts of cuttings. However, the drilling fluid travels longer distances under higher pressure and is subjected to higher temperatures.

During these drilling operations, the drilling fluid is monitored and adjusted to obtain the desired characteristics at various depths and under varying conditions. For example, there are three fluid properties which are monitored. These three properties are viscosity, yield point and fluid loss. And in general, it is desirable to maintain these properties constant over the longest possible duration. It is also desirable to use additives which are compatible with other materials in the drilling fluid, to use thermally stable non-toxic additives, to avoid excessive usage and to prevent environmental pollution.

A wide variety of drilling fluids have been used. For example, clay based drilling fluids have been used for cooling and particle removal. In fact, the U.S. Pat. No. 4,519,923 discloses the use of sodium carboxymethyl cellulose as a water loss reducing agent to be included in drilling mud. Hori also discloses the use of sulfoethyl-cellulose alkali metal salts as a water loss reducing agent.

In addition, the U.S. Pat. No. 3,872,018 discloses a fluid loss control at temperatures over 300° F. in clay-free sea water muds by the addition of polyvinyl alcohol with starch and that urea with the polyvinyl alcohol further increases temperature stability. As stated in that patent 2 to about 10 pounds per barrel of polyvinyl alcohol is sufficient. And, the average molecular weight of the polyvinyl alcohol ranges from at least about 170,000 to over 200,000.

Another approach for a High Temperature Stable Fluid Loss Control System is disclosed by Green U.S. Pat. No. 4,473,480. Green discloses a combination of (a), silicate or alumino silicate material; (b) a chemical compound capable of converting to a higher oxidation state under alkaline conditions; and, (c) a reaction product formed between a polymeric material selected from polyvinyl alcohol or hydroxyalkyl cellulose and a cross linking agent. Green discloses reacting a polyvinyl alcohol having an average molecular weight of between 90,000 to 200,000 with an aldehyde such as formaldehyde or melamine formaldehyde.

SUMMARY OF THE INVENTION

It has now been found that water soluble polymers such as a sulfonated amino-formaldehyde and/or methyl cellulose or polyvinyl alcohol may be added to the usual combination of water, bentonite and a weighting agent such as barite to produce a drilling fluid having improved heat stability. And, the improved drilling fluids can be used in a process for drilling a borehole into a subterranean formation using conventional drilling equipment. For example, the aforementioned drilling or well servicing fluids are circulated in the borehole during rotary drilling into a subterranean formation using conventional borehole drilling equipment.

In a second embodiment of the invention, a well servicing fluid having improved heat stability includes water, bentonite, a weighting agent, about 1 to 3 pounds per barrel of a sulfonated-amino-aldehyde resin and a material selected from the group consisting of methyl cellulose, polyvinyl alcohol and mixtures thereof.

Another embodiment of the invention is particularly applicable as a spud mud i.e., for drilling the initial zone of a well. The drilling fluids according to this embodiment have excellent carrying capacity as indicated by a relatively high yield point ranging from 20 to 30 pounds per 100 square feet and a plastic viscosity of 3-6 centipoise. These drilling fluids include brackish water having total dissolved solids of at least 2600 parts per million, between about 15 and 25 pounds per barrel of bentonite, preferably about 20 pounds per barrel (ppb) and between 0.1 to 0.4 ppb of a water soluble polymer. The water soluble polymer is selected from the group consisting of sulfonated-amino-aldehydes, methyl cellulose, polyvinyl alcohol and mixtures thereof.

For the second and third drilling zones, a preferred embodiment of the invention includes a mixture of brackish water having total dissolved solids of at least 2600 parts per million and between about 20 and 30 pounds per barrel of bentonites, preferably about 25 ppb. In addition, approximately 1 to 3 ppb of a sulfonated-amino aldehyde, preferably a sulfonated-amino formaldehyde condensate, about 0.25 to 0.75 ppb of caustic soda and preferably about 0.45 ppb, about 1 to 3 ppb carboxymethyl cellulose, preferably 2 ppb and about 100 to 140 ppb of a weighting agent such as a barite, preferably 120 ppb are added to the aforementioned mixture to provide a drilling fluid which has improved thermal stability.

It has now been found that the well servicing fluids according to the present invention have a number of advantages over the prior art. For example, the compositions disclosed herein provide the desired rheological and filtration properties for immediate, intermediate and long term application. In addition, the well servicing fluids have improved heat stability, are efficient and relatively inexpensive. Such fluids are also free of toxic or heavy metals and therefore environmentally safe. And, because of the environmental safety and because of the presence of nitrogen, may be used in agriculture as a source of nutrients for plants.

DETAILED DESCRIPTION OF THE INVENTION

The present invention is directed to compositions for use in well drilling and to compositions having improved heat stability. It is also directed to the use of such compositions in drilling wells into subterranean formations. The present invention is also directed to novel additives for controlling the rheological characteristics of a drilling fluid and to a method for making such additives.

According to the present invention, the desired rheological characteristics are met by using a novel combination of water soluble polymers consisting of sulfonated-amino-formaldehyde resins and methyl cellulose or polyvinyl alcohol, added to the usual combination of water, bentonite, and weighting agent such as barite, crushed oyster shells or the like for use as a drilling mud. The composition of the drilling mud can then be varied to meet specific drilling requirements. For example, the drilling fluids according to the present invention are prepared by mixing 1000 parts (by weight) of water, having total dissolved solids in the range of 500 to 5000 parts per million with 40-80 parts (by weight) of bentonite, an appropriate amount of a weighting agent to obtain the desired density and the pH is adjusted to around 10 using caustic soda. And then, the properties of this basic drilling mud is modified or adjusted as required by drilling conditions, by adding 0-2 parts (by weight) of methyl cellulose, preferably 0-0.5 part, or 0-4 parts of polyvinyl alcohol, preferably 0-1 part, and 0-10 parts of sulfonated amino aldehyde resins, preferably 0-5 parts. The drilling fluid is then well blended. The methyl cellulose used is a commercial cellulose ether having a preferred degree of substitution in the range 1.6-1.8, and water solution viscosity at 20° C. for a 2% by weight solution in the range 250-10,000 cP, preferably in the range 400-4000 cP. The polyvinyl alcohol according to the present invention should have an average molecular weight in the range 15,000-100,000, preferably 22,000-100,000 and a degree of hydrolysis in the range of 86-89%. The sulfonated amino-formaldehyde resins according to this invention are made of melamine, urea, formaldehyde and a sulfonating agent such that the percentage of urea in the amino component of the resin is in the range 0-100%, the ratio of formaldehyde to amino groups is in the range 0.8-1.5, and the ratio of sulfonate groups to amino groups is in the range 0.25-0.4. Such resins preferably have an average molecular weight within the range of about 700,000 and 1,200,000 and may be made in accordance with the disclosure in U.S. Pat. No. 4,677,159. It is preferable for economical reasons that the sulfonated amino formaldehyde resins be based on urea only.

A sulfonated-amino-formaldehyde resin based on urea is prepared as follows: 100 part of paraformaldehyde is dissolved in 428 parts of water and the pH of the solution is adjusted to 10-13 with an alkali metal hydroxide. The mixture is then heated to 40°-60° C. for 15-45 minutes. After the solution becomes clear, the temperature of the solution is raised to 70°-90° C., preferably 75°-85° C., and the pH adjusted within the range of 9.5-11.5, preferably, 10.0-11.0; and 50-60 parts of urea are added. Heating is continued for 5-30 minutes, preferably, 10-20 minutes, and then 10.5-12.0 parts of sodium metabisulfite is added and heated for 30-90 minutes, preferably, 55-70 minutes. The pH is then brought down to 2.5-3.5 with an acid, preferably sulfuric acid, and the heating is continued for 60-150 minutes, preferably 80-120 minutes. Finally, the solution is neutralized and kept at the same temperature for 50-80 minutes, filtered, and then the pH is adjusted to 9.5-10.5.

To further illustrate the invention, typical well drilling operations will be described to show how the formulations disclosed herein are utilized in modifying and adjusting the properties of the basic mud mixture, namely, the yield point, plastic viscosity and filtration losses. Thus, during the initial phases of drilling, the drilling fluid, which is referred to sometimes as "spud mud", should preferably have a plastic viscosity (PV) of 3-6 cP, and a yield point (YP) of 20-30 lb/100 ft$^2$. A typical basic drilling mud mix without a weighting agent, used in this phase of the drilling has a PV of 2 cP and a YP of 4.0 lb/100 ft$^2$. To adjust the properties of this mix, the normal practice involves the addition of caustic soda to the mud mix in the range 0.3-3.0 parts per 1000 parts of the mud mix. This additive modifies the properties of the mud by raising the YP and the PV to values in the range 10-90 lb/100 ft$^2$ and 4-15 cP, respectively. However, if the mud is adjusted to the desired YP of 25-30 lb/100 ft$^2$, then the PV will be in the range 7-9 cP which increases the pressure drop on the fluid circulation equipment. Furthermore, the mud loses its properties quite rapidly (as illustrated by example 8) as time of usage increases. However, the addition of either methyl cellulose in the range of 0.1-0.5 parts, or polyvinyl alcohol in the range of 0.2-1 parts in accordance with the present invention will lead to the desired values for both PV and YP. In addition, the mud maintains these properties over a longer period of time. In other words, the use of methyl cellulose or polyvinyl alcohol has the advantage over caustic soda in meeting the properties required and at the same time has the further advantage of lower consumption due to lower doses and longer stability. Examples 2-7 illustrate these advantages.

For deeper drilling operations, the PV and YP are normally adjusted to around 5-6 cP and YP to 8-25 lb/100 ft$^2$, respectively. For the adjustment of the PV and YP, a number of additives based on lignin were developed and are presently in current use. However, there is a major disadvantage in using unmodified lignin-based additives because of their thermal instability. This was overcome to a degree by complexing these additives with transition metals such as chromium. However, the use of the new generation of transition metal stabilized lignin-based additives creates a pollution problem due to the toxicity of the transition metals. It should be stressed that pollution by drilling muds cannot be easily confined since the fluids normally seep into underground water reservoirs during the drilling operation or later when discarding the mud at the end of operation.

The new additives, according to the present invention are based on sulfonated-amino-formaldehyde resins with or without methyl cellulose or polyvinyl alcohol, are thermally stable and effectively control the PV and YP of the mud to the desired values. The additives are also environmentally safe and degradable. Furthermore, they can be used as source of nitrogen for plants.

Examples 1 through 17 illustrate the advantages of the additives of the present invention versus those of two commercial products.

The following examples are presented to illustrate the present invention. Example 1 illustrates the preparation of a basic mud mix and the methods used in evaluating the properties of the mud in accordance with the testing procedure set forth in the "API Recommended Practice, Standard Procedure for Testing Drilling Fluid" 10the Edition, American Petroleum Institute, Dallas, Tex., 1984. Examples 2-8 illustrate the effects of various types of methyl cellulose, polyvinyl alcohol and caustic soda on "spud mud" properties. Table 1 summarizes the results of these examples and illustrates the benefits of the present invention.

For example, if 0.2 ppb methyl cellulose (MC1500) is used, the PV and YP are in the required range for "spud mud" and their values drop after 24 hours by around 30% and 47% respectively. For comparison, when caustic soda is used at 0.5 ppb, the PV and YP were 9.0 cP and 49.5 lb/100 ft$^2$ respectively. But, after 24 hours, these values dropped by around 55% and 87%, respectively. Table 1 also shows that polyvinyl alcohol (PVA) modifies the properties of the mud and is more stable. For example, 1.5 ppb of caustic soda is required to maintain a level of the PV and YP of 5.0 cP and 12.5 lb/100 ft$^2$, respectively, over a 24 hour period. This level is lower than desired. In contrast, only 0.2 ppb of MC4000, a commercially available methyl cellulose, or 0.4 ppb of PVA100 is needed to maintain the same properties after 24 hours.

The preparation of a novel sulfonated urea formaldehyde is illustrated in Example 11.

The compatibility of the new additives with each other is important for modifying the properties of the mud as the drilling operation continues. This is illustrated in examples 9 and 10 which shows the effects of the presence of PVA100 or MC4000 and sulfonated-urea-melamine-formaldehyde resins on the properties of "spud mud". The results indicate no adverse effects for the simultaneous addition of both additives.

In drilling operations, the drilling fluid is modified as the well gets deeper. Example 12 illustrates a typical mix used in deeper well operations. In addition, to the PV and YP, three other properties of the fluid are also important at this stage, namely, the initial gelation (IG), the ten-minute gelation (10G), and the fluid loss (FL). These properties are determined by standard techniques described in the earlier referenced "API Recommended Practice, Standard Procedure for Testing Drilling Fluid."

The normal practice regarding the control of fluid loss is the use of thickeners such as carboxymethyl cellulose of various molecular weights. These thickeners, however, raise the PV, YP, IG and 10G. As a result, thinners are normally added to control these properties. Examples 13-16 describe the effects of a commercial ligno-sulfonate product (Spersene), a sulfonated-melamine-formaldehyde resin, and a sulfonated-urea-formaldehyde resin as thinners for deep-well drilling fluids. The results of these experiments (shown in Table 2), indicate that the proposed additives according to the present invention have improved properties over those of the commercial ligno-sulfonate product in that the YP is not reduced extensively. Furthermore, the additives do not have an adverse effect on fluid loss (FL).

Additional advantages of the sulfonated-amino-formaldehyde resins are further illustrated by example 17, which shows their thermal stability versus lignosulfonate thinner. It should be noted that in normal deep well drilling operations, the drilling fluid is subjected to high temperatures. Therefore, it is important that the additives used are stable with respect to thermal degradation. Table 3, which summarizes the results of example 17, shows the deterioration of the properties of the drilling fluids containing lignosulfonate based additives versus those containing sulfonated-amino-formaldehyde based resins. Thus for "spersene", the changes in PV, YP, IG and 10G are $-30\%$, $-83\%$, $-60\%$, and $-86\%$, respectively, while, the corresponding reductions for sulfonated-urea-formaldehyde are $-23\%$, $-33.3\%$, $-57\%$, and $+38\%$, respectively.

Attempts to stabilize lignosulfonate additives by the incorporation of transition metal ions, particularly chromium, in their composition have been successful in improving the thermal properties of these additives. However, the disadvantages of these additives is the pollution problem they create due to the toxicity of the transition metals. This problem is not encountered with sulfonated-amino-formaldehyde resins.

EXAMPLE 1

2310 gm of brackish water (total dissolved solids=2900) were mixed with 132 gm of Wyoming bentonite at high speed for 30 minutes. This mix will be referred to as the control or base mix; it contains 20 ppb of bentonites. A sample of this mix was taken and mixed for 5 minutes in a high speed blender. Then the rheological properties of the base mix were immediately measured using a standard Fann viscometer model 35 SA. The plastic viscosity (PV) of the drilling fluid may be obtained by subtracting the 300 reading from the 600 reading; while the yield point (YP) of the fluid is determined by subtracting the plastic viscosity value from the 300 reading. The unit of plastic viscosity is centipoise (cP), and the units of the yield point are (lb/100 ft$^2$). After determining the initial PV and YP values of the base mix, the base mix was allowed to stand for four hours. Then it was blended for 5 minutes at high speed and its PV and YP were measured. Finally the sample was left at room temperature for 20 more hours (total time is 24 hours). Subsequently, the sample was blended for 5 minutes using the same high speed blender, and its rheological properties were determined for the third time. The results of these measurements are shown in Table 1.

EXAMPLE 2

2310 gm of brackish water (total dissolved solids=2900) were mixed with 132 gm of Wyoming bentonite at high speed for 30 minutes. A sample of the prepared base mix was taken, and to it was added 0.1 grams i.e. the equivalent of 0.1 ppb of methyl cellulose whose 2% aqueous solution viscosity at 20° C. is 400 centipoise. This methyl cellulose will be referred to as MC400. The base mix and additive were blended for five minutes in a high speed blender. And then the PV and YP values of the mixture were measured. After four hours the mixture was blended for 5 minutes and its PV and YP were determined. And again, after 24 hours from the initial readings, the sample was blended for 5 minutes and its PV and YP values were measured. The values of PV and YP are shown in Table 1. The same procedure was repeated for other doses including 0.2 ppb, 0.3 ppb and 0.4 ppb. Again the results are shown in Table (1).

EXAMPLE 3

The procedure described in example 2 was followed except that methyl cellulose whose 2% aqueous solution viscosity at 20° C. is 1500 cP was used. This methyl cellulose is designated as MC1500. The PV and YP of these drilling fluids are shown in Table (1)

EXAMPLE 4

The procedure described in example 2 was followed except that methyl cellulose whose 2% aqueous solution viscosity at 20° C. is 4000 cP was used. This methyl cellulose is designated as MC4000. The results of the measurements are given in Table (1).

EXAMPLE 5

The same procedure described in example 2 was repeated except that polyvinyl alcohol with a molecular weight of 22,000 was used. This polyvinyl alcohol polymer will be referred to as PVA22. The results of the 0.3 and 0.4 ppb dose are given in Table (1).

EXAMPLE 6

The same procedure described in example 2 was repeated except that polyvinyl alcohol with a molecular weight of 49,000 was used. This polyvinyl alcohol will be referred to as PVA49. The results of the 0.3 and 0.4 ppb dose are given in Table (1).

EXAMPLE 7

The same procedure described in example 2 was repeated except that polyvinyl alcohol with a molecular weight of 100,000 was used. This polyvinyl alcohol will be referred to as PVA100. The results of the 0.1, 0.2, 0.3 and 0.4 ppb doses are given in Table (1).

EXAMPLE 8

The procedure described in example 2 was followed except that caustic soda (sodium hydroxide) was used. The doses for this commercial viscosifier varied between 0.25 and 1.50 ppb. The rheological properties of the drilling fluid are shown in Table (1).

TABLE 1

The Effects of Methyl Cellulose, Polyvinyl Alcohol and Caustic Soda on YP* and PV** of fresh and aged "spud mud"

| Example | Additive | Dose (ppb) | Immediate PV | Immediate YP | 1 h later PV | 1 h later YP | Overnight PV | Overnight YP |
|---|---|---|---|---|---|---|---|---|
| 1 | — | — | 2.0 | 4.0 | 2.0 | 4.0 | 2.0 | 3.5 |
| 2 | MC400 | 0.1 | 3.0 | 13.0 | 3.0 | 9.0 | 2.5 | 7.0 |
|   |   | 0.2 | 4.5 | 22.5 | 4.5 | 14.5 | 3.5 | 12.5 |
|   |   | 0.3 | 5.5 | 31.5 | 5.5 | 20.5 | 4.5 | 16.0 |
|   |   | 0.4 | 5.0 | 42.5 | 4.0 | 31.5 | 4.0 | 26.5 |
| 3 | MC1500 | 0.1 | 3.0 | 18.0 | 3.0 | 12.0 | 2.5 | 20.5 |
|   |   | 0.2 | 5.0 | 33.5 | 4.5 | 23.0 | 3.5 | 18.0 |
|   |   | 0.3 | 5.5 | 49.5 | 4.0 | 36.5 | 3.5 | 27.5 |
|   |   | 0.4 | 6.0 | 62.0 | 5.0 | 55.0 | 4.0 | 42.0 |
| 4 | MC4000 | 0.1 | 3.5 | 23.5 | 3.0 | 14.5 | 2.5 | 11.5 |
|   |   | 0.2 | 5.0 | 43.5 | 4.5 | 26.5 | 3.5 | 20.0 |
|   |   | 0.3 | 6.0 | 59.0 | 4.0 | 43.5 | 3.5 | 35.0 |
|   |   | 0.4 | 7.5 | 70.0 | 5.0 | 63.5 | 3.5 | 52.0 |
| 5 | PVA22 | 0.3 | 5.0 | 18.0 | 4.5 | 12.5 | 4.0 | 12.0 |
|   |   | 0.4 | 4.0 | 29.5 | 3.5 | 19.0 | 3.5 | 14.0 |
| 6 | PVA49 | 0.3 | 5.5 | 21.5 | 4.5 | 13.5 | 4.0 | 10.0 |
|   |   | 0.4 | 4.5 | 33.5 | 3.5 | 24.0 | 3.5 | 17.0 |
| 7 | PVA100 | 0.1 | 3.5 | 11.0 | 3.0 | 8.0 | 3.0 | 5.0 |
|   |   | 0.2 | 5.0 | 13.5 | 4.5 | 11.0 | 3.5 | 8.0 |
|   |   | 0.3 | 7.0 | 23.0 | 6.5 | 17.0 | 5.5 | 12.5 |
|   |   | 0.4 | 7.0 | 39.0 | 7.0 | 27.5 | 6.5 | 21.0 |
| 8 | NaOH | 0.25 | 3.5 | 16.0 | 3.5 | 11.5 | 3.0 | 5.5 |
|   |   | 0.50 | 9.0 | 49.5 | 5.5 | 29.0 | 4.0 | 6.5 |
|   |   | 1.00 | 14.0 | 90.0 | 10.0 | 64.0 | 5.0 | 10.0 |
|   |   | 1.50 | 14.0 | 90.0 | 8.5 | 65.0 | 5.0 | 12.5 |

*YP: the unit is lb/100 ft$^2$
**PV: the unit is cP

EXAMPLE 9

The procedure described in example 2 was followed except that 0.2 ppb of MC4000 and 1.0 ppb of sulfonated urea-melamine formaldehyde resins with 40% urea were added. Initial PV and YP of the resulting mud are 6 cP and 40.5 lb/100 ft$^2$, respectively.

EXAMPLE 10

The procedure described in example 2 was followed except that 0.4 ppb of sulfonated-urea-melamine formaldehyde resin with 40% urea were added. Initial PV and YP of the resulting mud are 7 cP and 42 lb/100 ft$^2$, respectively.

EXAMPLE 11

105 gm of paraformaldehyde were dissolved in 450 gm of water. Then 2-3 drops of sodium hydroxide (28 wt. %) were added and the solution was kept at 50° C. for 30 minutes. Then the temperature was raised to 80° C., the pH was raised to 10.5 and 60 gm of urea were added. The solution was kept at 80° C. for 15 minutes, then 12 gm of sodium metabisulfite were added and the solution was kept at about the same temperature for an additional one hour. The pH was lowered to 3.0 using sulfuric acid and maintained at about 80° C. for an additional 90 minutes. Then the solution was neutralized and kept at the 80° C. temperature for 60 minutes. Finally, the solution was filtered and its pH was raised to 10. The resulting sulfonated-urea-formaldehyde had a viscosity of 2 centipoise at 20° C.

EXAMPLE 12

2283 gm of brackish water (total dissolved solids=2600) were mixed with 165 gm of 100% wyoming bentonite and 30 gm of a 10% caustic soda solution in a high speed mixer for thirty minutes. The suspension was left for 24 hours to stabilize and for the bentonites to hydrate. Approximately 2.0 ppb of carboxymethyl cellulose of low viscosity (CMC-LV) was added. The mixture was blended in a high speed blender for 5 minutes. Then to this mixture 120 ppb of barite (barium sulfate) was added and the resulting mixture blended for five more minutes at high speed. Then the sample was taken and its PV, YP, initial gelation (IG), ten-minute gelation (10G) and fluid loss (FL) were determined using standard procedures. The results are shown in Table 2.

EXAMPLE 13

Drilling fluids were prepared according to example 12 except that in addition to CMC-LV, various doses of a lignosulfonate-based additive, known commercially as Spersene and NaOH were added prior to the addition of barite. The results are shown in Table 2.

EXAMPLE 14

Drilling fluids were prepared according to example 12 except that sulfonated-melamine-formaldehyde resins (SMF) were prepared in accordance with U.S. Pat. No. 4,677,159 were added instead of Spersene. The results are shown in Table 2.

EXAMPLE 15

Drilling fluids were prepared according to example 12 except that sulfonated-melamine-urea-formaldehyde resins with 40% urea (SUMF 40) were prepared in accordance with U.S. Pat. No. 4,677,159 were added instead of Spersene. The results are shown in Table 2.

EXAMPLE 16

Drilling fluids were prepared according to example 12 except that sulfonated-urea-melamine-formaldehyde resins (SUMF) of example 11 were added instead of Spersene. The results are shown in Table 2.

TABLE 2
The Effects of Sulfonated Amino-Formaldehyde Resins on Drilling Muds

| Additive | Dose (ppb) | Plastic Viscosity (cP) | Yield Point (lb/100 ft²) | Initial Gel | 10 min Gel | Fluid Loss (ml) |
|---|---|---|---|---|---|---|
| None (control) | — | 16 | 18 | 10 | 10 | 7.7 |
| Spersene + NaOH pH~9.5 | 1.0 | 17 | 14 | 10 | 40 | 7.3 |
|  | 3.0 | 15 | 9 | 6 | 18 | 6.4 |
|  | 5.0 | 15 | 7 | 4 | 16 | 5.2 |
| SMF | 1.0 | 15 | 14 | 7 | 42 | 7.2 |
|  | 3.0 | 14.5 | 11 | 5 | 37 | 7.0 |
|  | 5.0 | 14 | 11 | 5 | 35 | 6.9 |
| SUMF40 | 1.0 | 15 | 13 | 6 | 48 | 7.2 |
|  | 3.0 | 14 | 11 | 5 | 40 | 7.1 |
|  | 5.0 | 13 | 11 | 5 | 36 | 6.9 |
| SUF | 1.0 | 16 | 15 | 9 | 55 | 8.7 |
|  | 3.0 | 15 | 12 | 7 | 39 | 8.6 |
|  | 5.0 | 14 | 12 | 7 | 38 | 8.1 |

EXAMPLE 17

To test the thermal stability of the drilling mud, and to check the rate of deterioration of its filtration and rheological properties under the conditions of high temperature, high hydrostatic pressure and continuous circulation, the following test was carried out. Samples prepared according to examples 13, 14, 15, and 16 with a dose of 3 ppb of the additive were placed in a rolling oven operating at 350° F. for various times ranging from 3 to 24 hours; after which samples were removed and cooled in 20 minutes in a cold water bath. Samples were then blended in a high speed blender for five minutes and then the PV, YP, IG, 10G and FL were determined. The additives investigated in this aging study were Spersene, sulfonated-melamineformaldehyde (SMF), sulfonated-urea-melamine-formaldehyde (SUMF) and sulfonated-urea-formaldehyde (SUF). The results are shown in Table 3.

TABLE 3
The Stability of the Properties of Drilling Muds Prepared Using Different Additives

| Additive | Hours of Aging at 350° F. | Plastic Viscosity (cp) | Yield Point (lb/100 ft²) | Initial Gel | 10 min Gel | Fluid Loss (ml) |
|---|---|---|---|---|---|---|
| Spersene + NaOH | 0 | 15 | 9 | 5 | 36 | 6.6 |
|  | 3 | 10 | 5.5 | 4 | 15 | 13.3 |
|  | 6 | 9.5 | 2.5 | 2 | 12 | 20.6 |
|  | 24 | 10.5 | 1.5 | 2 | 5 | 24.8 |
| SUMF | 0 | 15 | 10 | 6 | 38 | 7.3 |
|  | 3 | 10 | 8.5 | 4 | 22 | 13.2 |
|  | 6 | 9.5 | 8 | 8 | 22 | 27.6 |
|  | 24 | 9 | 4.5 | 2 | 8 | 32.7 |
| SMF | 0 | 15 | 11 | 6 | 35 | 7.2 |
|  | 3 | 10 | 10 | 5 | 31 | 11.2 |
|  | 6 | 9 | 6 | 5 | 20 | 28.9 |
|  | 24 | 10 | 4 | 2 | 8 | 34.3 |
| SUF | 0 | 15 | 12 | 7 | 39 | 8.6 |
|  | 3 | 12 | 10.5 | 6 | 40 | 10.0 |
|  | 6 | 10.5 | 7.5 | 4 | 55 | 22.6 |
|  | 24 | 11.5 | 8.0 | 3 | 54 | 30.6 |

While the invention has been described in connection with certain preferred embodiments, it is not intended to limit the invention to the particular forms set forth, but it is intended to cover such alternatives, modifications, and equivalents as defined by the appended claims.

What is claimed is:

1. A well serving fluid having improved heat stability comprising in combination brackish water having total dissolved solids of at least 2,600 parts per million, bentonite within the range of about 15 to about 30 pounds per barrel, a weighting agent, about 1 to 3 pounds per barrel of a sulfonated amino-aldehyde resin prepared from formaldehyde and a material selected from the group consisting of urea, and mixtures of melamine and urea with the percentage of urea in the amino component of the resin in the range of up to 100%, the ratio of formaldehyde to amino groups in the range of 0.8–1.5, and the ratio of sulfonate groups to amino groups in the range of 0.25–0.4, and a material selected from the group consisting of methyl cellulose in the range of 0.1 to 0.5 pounds per barrel and polyvinyl alcohol in the range of 0.2 to 0.5 pounds per barrel and mixtures thereof, in which the sulfonate-amino-formaldehyde resin has an average molecular weight within the range of about 700,000 and 1,200,000 and in which the polyvinyl alcohol has an average molecular weight in the range of about 15,000 to 100,000 and the methyl cellulose has a degree of substitution in the range of 1.6 to 1.8 and water solution viscosity at 20° C. for a 2% by weight solution in the range of 400 to 4,000 centipoise.

2. A well servicing fluid according to claim 1 which includes approximately 0.2 pounds per barrel of methyl cellulose having a viscosity of about 4000 centipoise for a 2% aqueous solution at 20° C. and about 1.0 parts per barrel of sulfonated-urea-melamine formaldehyde resins with 40% urea added.

3. A well servicing fluid according to claim 1 which includes about 0.4 pounds per barrel of polyvinyl alcohol having an average molecular weight of about 100,000.

4. A well servicing fluid according to claim 1 which includes about 0.1 pounds per barrel of methyl cellulose having a viscosity of about 400 centipoise for a 2% aqueous solution measured at 20° C.

5. A well servicing fluid according to claim 1 which includes about 0.1 pounds per barrel of methyl cellulose having a viscosity of about 1500 centipoise for a 2% aqueous solution measured at 20° C.

6. A well servicing fluid according to claim 1 which includes about 0.1 pounds per barrel of methyl cellulose having a viscosity of about 4000 centipoise for a 2% aqueous solution measured at 20° C.

7. A well servicing fluid according to claim 1 which includes between 0.3 and 0.4 pounds per barrel of polyvinyl alcohol having an average molecular weight of about 22,000.

8. A well servicing fluid according to claim 1 which includes between 0.3 and 0.4 pounds per barrel of polyvinyl alcohol having an average molecular weight of about 49,000.

9. A well servicing fluid according to claim 1 which includes between 0.1 and 0.4 pounds per barrel of polyvinyl alcohol having an average molecular weight of about 100,000.

10. A well servicing fluid according to claim 1, wherein the bentonite is Wyoming bentonite which is present in the fluid in an amount of about 20 pounds per barrel.

11. A well servicing fluid according to claim 10 wherein the well servicing fluid has a yield point ranging from about 20 to 30 pounds per 100 square feet and a plastic viscosity of between 3 to 6 centipoise.

12. A well servicing fluid according to claim 11 wherein the yield point is about 24 pounds per 100 square feet.

13. In a process for drilling a borehole into a subterranean formation using conventional borehole drilling equipment, the improvement comprising circulating in the borehole while drilling a well servicing fluid according to claim 1.

* * * * *

UNITED STATES PATENT AND TRADEMARK OFFICE
CERTIFICATE OF CORRECTION

PATENT NO. : 4,839,095

DATED : June 13, 1989

INVENTOR(S) : Shawqui Lahalih; Issam Dairanieh; Ma'mun Absi-Halabi

It is certified that error appears in the above-identified patent and that said Letters Patent is hereby corrected as shown below:

On the title page, insert:

[73]  Assignee:  Kuwait Institute for Scientific Research, Safat, Kuwait

Signed and Sealed this

Thirtieth Day of October, 1990

Attest:

HARRY F. MANBECK, JR.

*Attesting Officer*      *Commissioner of Patents and Trademarks*